United States Patent [19]

Brown, Jr. et al.

[11] 4,359,896
[45] Nov. 23, 1982

[54] DYNAMIC TIRE TESTING APPARATUS

[75] Inventors: Jack E. Brown, Jr.; Christopher E. Christie; Joseph M. Forney, all of Akron; Richard M. Underwood, Tallmadge, all of Ohio

[73] Assignee: The Goodyear Tire & Rubber Company, Akron, Ohio

[21] Appl. No.: 212,517

[22] Filed: Dec. 3, 1980

[51] Int. Cl.³ ............................................. G01M 17/02
[52] U.S. Cl. .......................................... 73/146; 73/663
[58] Field of Search .................... 73/579, 570, 663, 146

[56] References Cited

U.S. PATENT DOCUMENTS 3,871,210  3/1975  Himmler et al. ........................ 73/570
4,171,641  10/1979  Landsness ............................... 73/146

*Primary Examiner*—James J. Gill
*Attorney, Agent, or Firm*—Frederick K. Lacher; T. P. Lewandowski

[57] ABSTRACT

Apparatus for obtaining tire dynamic characteristics in which a wheel and tire assembly is mounted on a shaft assembly of low mass. The tire tread is engageable with either a rotating or stationary supporting surface. Flexible connecting members having load-applying capabilities for urging the tire tread into loaded engagement with the tire supporting surface are located at each side of the tire and connected to the shaft assembly. The desired loading is measured by load cells on the connecting members. The tire may be vibrated at predetermined frequencies and amplitudes in predetermined directions by exciters and the resulting tire dynamic data selectively measured by one or more accelerometers.

20 Claims, 8 Drawing Figures

DYNAMIC TIRE TESTING APPARATUS

The ride characteristics of an automobile depend on not only the dynamics of the vehicle but also the dynamics of the tires. Automobile manufacturers have been using advanced testing and analysis technology to develop a good understanding of factors affecting vibration in vehicles; however, most of these studies have ignored the tires themselves.

It is known that some tire characteristics contribute to "shake" and "harshness" problems of a vehicle. In order to provide the best ride properties with a minimum of "shake" and "harshness", it has been the practice to "tune" the tire/vehicle combination through a series of trial and error iterations on vehicle prototypes by the tire and vehicle manufacturers. This has required a considerable amount of time and expense, and does not fully utilize the vehicle dynamics data of the automobile manufacturers.

Tests to determine the dynamics of tires have been made over the years and provide data as to general characteristics for rolling and nonrolling tires subject to vibrations. Testing machines have also been developed to determine the natural frequency of a tire.

None of these tests and resulting data provide the specific relationship between the shake and harshness of a vehicle with wheels and tires and the dynamic characteristics of the wheels and tires. In order to obtain this relationship, it is important that the tire dynamics be defined independently of the vehicle. Obtaining a mathematical representation of a rolling or static tire without the influence of the vehicle dynamics then makes possible the eventual coupling of the tire model to a mathematical model of the vehicle. When this is done the interaction and sensitivities of the vehicle with the tires can be studied to determine those factors which have the most important affect on shake and harshness.

To define the tire dynamics independently of the vehicle requires testing a tire mounted on a standard wheel under a load which will create the normal tire patch and yet have a minimum degree of constraint on the wheel and tire in the six directions of motion. Preloading of the tire does require some constraint on the tire and also under testing conditions the tire needs to be stabilized. This requires a movable tire and wheel assembly fixture which has a dynamic response of a different character than the tire so that the fixture dynamics can be subtracted analytically from the dynamics of the tire-wheel assembly and fixture combination. The fixture must also be mounted in a frame having a minimum of dynamic response which will not adversely affect the dynamic response of the fixture or the tire-wheel assembly which are subjected to loading and induced vibration from the frame during the rolling and static tire tests.

In accordance with the invention, a tire testing apparatus is provided having a rigid frame positioned over a supporting surface against which the tire is pressed to create a normal tire patch. A supporting fixture of minimal mass including a shaft and rotatable hub is connected to the frame. The tire and wheel assembly is mounted on the hub and the shaft is connected to the rigid frame by flexible connections at opposite sides of the hub actuated by loading means to load the tire in a radial direction against the supporting surface. The supporting surface may be on a chassis roll of a dynamic testing machine for rolling tests or a platform with force/moment transducers for static tests. Exciters are mounted on the rigid frame in alignment with the fixture shaft in the fore-aft, vertical and lateral directions for excitation of the shaft in one direction at a time. A flexible connection between each of the exciters and a load cell attached to the shaft may be provided to minimize lateral motion constraints applied by the exciter. The response of the tire, wheel and fixture may be measured by accelerometers located in a centerplane containing the centerline of the tire tread and within the shaft as well as at each end of the shaft. During static tire tests the accelerometers may be located at other positions relative to the tire and shaft. The measurements of acceleration and force by the accelerometer and force cell provides input data for determining tire dynamic characteristics.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but several of the various ways in which the principles of the invention may be employed.

Figure 1:
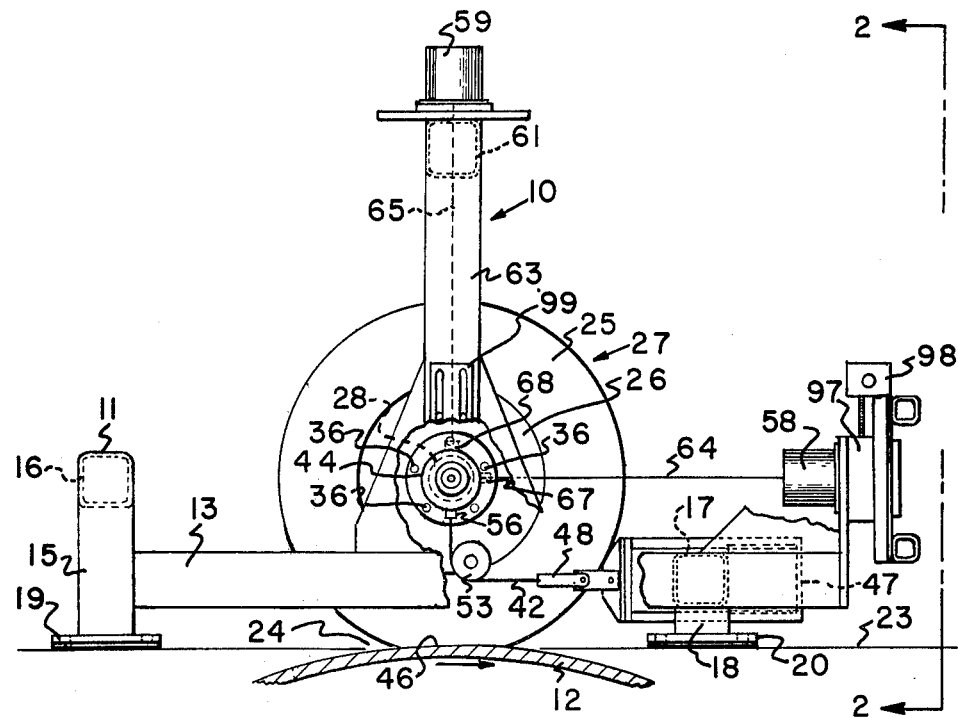
FIG. 1 is a partially schematic side view of a dynamic tire testing apparatus with parts being broken away.
Figure 2:
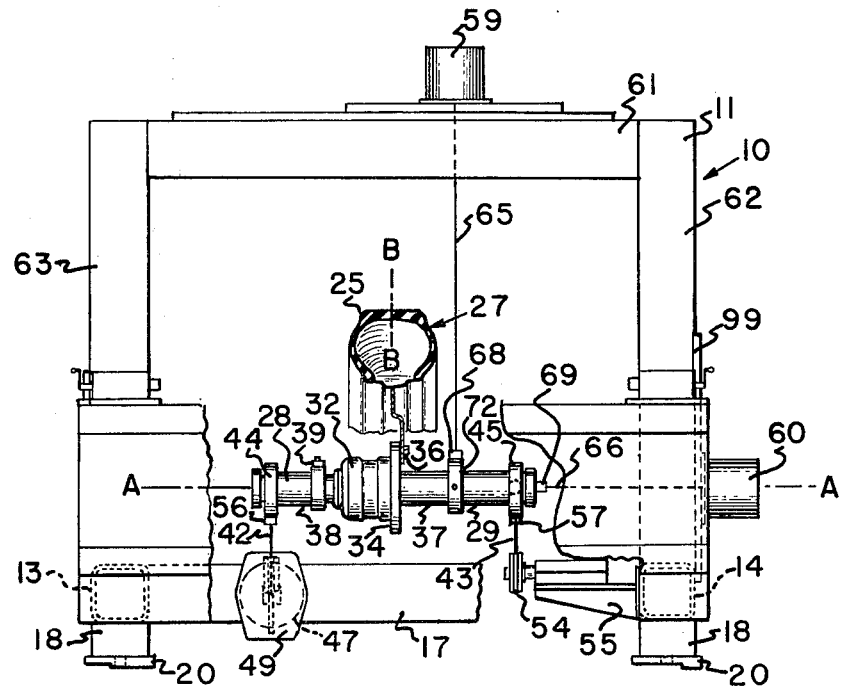
FIG. 2 is a partially schematic end view taken along line 2—2 of FIG. 1 with parts being broken away.
Figure 3:
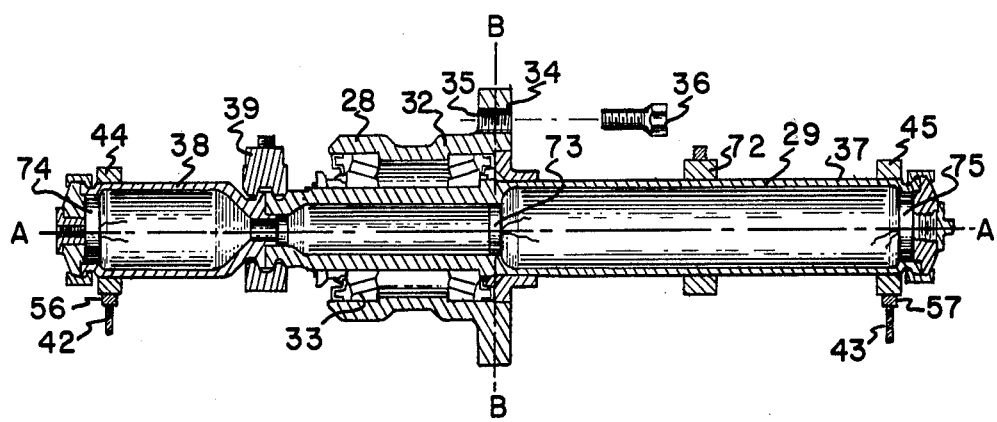
FIG. 3 is an enlarged sectional view taken along a plane through the axis of the shaft shown in FIG. 1.

Referring to FIGS. 1, 2 and 3, a tire testing apparatus 10 is shown which has a stationary structure such as rigid frame 11 and a tire supporting surface which may be a simulated curve or flat roadway surface such as a chassis roll or rotatable drum 12 of a dynamic testing machine of the type utilized for simulated rolling tests of tires.

The rigid frame 11 is of a welded construction made up of relatively heavy steel box beams with a pair of side members 13 and 14 connected to a pair of front stanchions 15. A front transverse member 16 connects the front stanchions 15. A rear transverse member 17 connects the side members 13 and 14 and is supported by rear stanchions 18 welded to the underside of the side members. Mounting plates 19 and 20 on the front stanchions 15 and rear stanchions 18, respectively, are preferably bolted to a base plate 23 of the dynamic testing machine. The base plate 23 has an opening 24 exposing the surface of the drum 12 for contact with a tire 25 to be tested.

The tire 25 is mounted on a standard wheel 26 providing a tire and wheel assembly 27 to be tested. A supporting fixture such as shaft assembly 28 is provided for supporting the tire and wheel assembly 27. The shaft assembly 28 is of minimal mass with a shaft 29 which may be hollow and made of steel or a lightweight material such as aluminum. A hub 32 is rotatably mounted on bearings 33 on the shaft 29 for rotation about an axis A—A of the shaft. The hub 32 may be of a lightweight material such as aluminum and has a flange 34 with threaded holes 35 circumferentially spaced to match corresponding holes in the wheel 26 which may be clamped to the flange by lug bolts 36 threaded in the holes 35. In the mounted clamped condition the tire and wheel assembly 27 is positioned for rotation about an axis which is coaxial with the axis A—A of the shaft 29.

The shaft 29 may have a hub section 37 extending axially outward from the hub 34 at one side and a hub extension 38 extending axially outward from the hub at the other side. The hub extension 38 is removably fastened to the shaft 29 by suitable means such as an axle clamp 39. In assembling the hub 34 and bearings 33 on the shaft 29, the hub extension 38 is removed and then mounted on the shaft after assembly.

As shown in FIGS. 2 and 3, flexible connecting means such as cable members 42 and 43 extend between the shaft assembly 28 and the frame 11 for constraining the movement of the shaft assembly and urging the tire 25 against the drum 12. The cable members 42 and 43 may be attached to the shaft 29 by cable collars 44 and 45 at side positions equidistant from the tire 25 which has a centerplane B—B containing the centerline of the tread of the tire.

Figure 8:
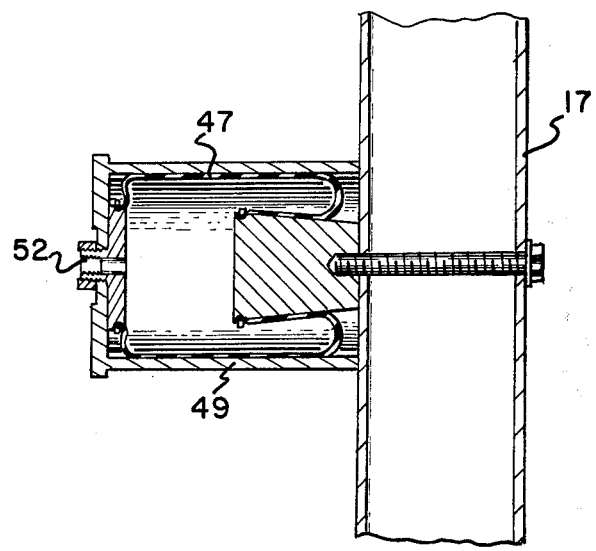
FIG. 8 is an enlarged detailed view of one of the air springs for urging the tire against the tire supporting surface.

At the other end of each of the cable members 42 and 43 is a loading means such as an air spring 47 mounted on the rear transverse member 17 as shown in FIGS. 1 and 8. Each of the cable members 42 and 43 is attached to a clevis socket 48 which is connected to a framework including a restraining sleeve 49 movable away from the rear transverse member 17 upon injection of air under pressure through a valve threaded in the threaded opening 52 of the air spring 47.

As shown in FIG. 1, the cable members 42 and 43 extend radially away from the axis A—A of the shaft 29 and around pulleys 53 and 54 mounted on brackets 55 which extend outwardly from the side members 13 and 14 of the rigid frame 11. The flexibility of the cable members 42 and 43 and location between the pulleys 53,54 and the shaft 29 results in the cables having a low spring rate in directions generally parallel with the supporting surface on drum 12.

The air spring 47 provides a low spring rate in a direction generally perpendicular to the surface of drum 12. The restraining sleeve 49 of the air spring 47 and the framework connecting the air spring to the clevis socket 48 have a low mass which, along with the flexible cable members 42 and 43, provide an optimum of dynamic response during imposition of the load by the air spring. Load cells 56 and 57 may be positioned between the air spring 47 at each side of the transverse member 17 and cable collars 44 and 45 to measure the load applied to the tire 25 so that the desired tire patch 46 may be provided on the drum 12.

In order to induce vibration in the tire 25, wheel 26 and shaft assembly 28, vibration inducing means such as electromechanical exciters 58, 59 and 60 are mounted on the rigid frame 11 at positions in alignment with the shaft 29 in the fore-aft, vertical and lateral directions for excitation of the shaft in one direction at a time.

The exciter 59 for the vertical vibration is mounted on an upper transverse member 61 between vertical members 62 and 63 extending upwardly from the side members 13 and 14 of the rigid frame 11. The exciters 58, 59 and 60 are mounted on the rigid frame 11 in alignment with the axis A—A of the shaft 29 for force input measurements in the fore-aft, vertical or lateral directions depending upon the direction of the force input applied to the shaft. The exciters 58, 59 and 60 are connected to the shaft 29 by rods 64, 65 and 66, respectively, and provide push-pull excitation through a flexible coupling and load cells 67, 68 and 69, respectively, attached to a drive clamp 72 mounted on the shaft 29 or to the end of the shaft.

Data for determining dynamic properties of the tire in response to the vibrations induced by the exciters 58, 59 and 60 may be collected by response measuring means mounted on the shaft assembly 28 such as strain gage accelerometers 73, 74 and 75 located within the shaft as shown in FIG. 3. Accelerometer 73 is located in the centerplane B—B containing the centerline of the tread of the tire 25 and accelerometers 74 equidistant from the centerplane B—B. Other accelerometers (not shown) may be placed along the shaft assembly 28 on the tire 26 or at other desired strategic positions.

In operation, the tire 25 to be tested is mounted on the wheel 26 and inflated to a desired pressure. The tire and wheel assembly 27 is then mounted on the hub 32 by removing the cable collars 44 and 45 and then inserting the hub section 37 through the opening in the wheel 26. The wheel 26 is bolted to the hub flange 34 by threading lug bolts 36 into the threaded holes 35. The cable collars 44 and 45 are then reinstalled on the shaft 29 and air pressure is communicated to the air spring 47 at each side of the transverse member 17. The tire patch 46 of the desired size under the desired load is measured by the load cells 56 and 57. One of the exciters 58, 59 or 60 is then connected to the corresponding load cell 67, 68 or 69 on the drive clamp 72 or the end of shaft 29 by the corresponding rod 64, 65 or 66. The tire and wheel assembly 27 may then be rotated at a desired speed by rotating the drum 12.

Upon actuation of the appropriate exciter 58, 59 or 60, input in the form of vibratory excitation of the shaft assembly 28 in the fore-aft, vertical or lateral direction is provided. The appropriate exciter 58, 59 or 60 provides push-pull excitation through the flexible coupling and appropriate load cell 67, 68 or 69 attached to the shaft 29. Random excitation is preferred to allow the use of averaging techniques in computing the frequency response functions.

The response of the tire 25, wheel 26 and shaft assembly 28 is measured by strain gage based accelerometers 73, 74 and 75 chosen for their high sensitivities in a small package with flat frequency response to zero frequency. With this system, a preferred test involves using a single exciter to provide input of a controlled measured force over a range of frequencies and measuring the response to that force with one or more accelerometers. These data can then be used to produce frequency response plots and mode shapes. These two types of test results are the fundamental tools used in understanding behavior of mechanical systems. The output of such an experimental artificial excitation analysis is composed of frequency response measurements and the mode shapes of the significant system resonances. There are two basic approaches which may be used for the acquisition of these data, analog and digital. Regardless of whether analog or digital methods are used, the frequency response and mode shape information have certain properties and can be interpreted to yield certain types of conclusions and information. These two types of data are related to each other and can be displayed in various ways.

A frequency response measurement is usually presented as a plot of acceleration excited with the electromechanical exciter in one direction and the corresponding load cell is used to measure the instantaneous force input by the exciter. The resulting response of the system is measured with the accelerometers 73, 74 and 75. The force is input over a preselected frequency range of interest. The force, acceleration and frequency data are processed either analog or digitally to yield a plot of acceleration/force as a function of frequency. These data may be acquired at different operating speeds in the range of interest. The results may be used to compare the dynamics of various tires and to generate an analytical model of a rolling tire for shake/harshness studies.

An impact response test of the tire 25 may be performed by passing a suitable impact source such as a cleat between the drum 12 and the tire to provide the impact excitation for the tire. The frequency responses may be measured in a similar manner to that described hereinabove.

Testing of the preloaded shaft assembly 28 by itself without a tire 25 or wheel 26 is also necessary so that any influence which the shaft assembly has on the tire and wheel assembly 27 during the tests can be accounted for by subtraction of the dynamics of the shaft assembly. The testing of the shaft assembly 28 to determine its dynamic characteristics and thus subtract them from the dynamics of the tire 25, wheel 26 and shaft assembly 28 data follows the same general procedures except that it is necessary to vertically preload the bare shaft assembly 28 to simulate the vertical load imposed on the shaft assembly during the tire and wheel test. For the purposes of this testing, the only preload forces simulated are the vertical one during the shaft assembly 28 test. The vertical preload force is applied through soft springs (Bungie cords) to the center of the shaft assembly 28 with the overhead force supplied by a small crane (not shown). As was the case with testing the tire 25, it is necessary to minimize the additional constraint applied to the shaft assembly 28 by the preload Bungie cords. Thus, part of the shaft assembly test involves the preload Bungie cords to determine if another level of subtraction is necessary.

Figure 4:
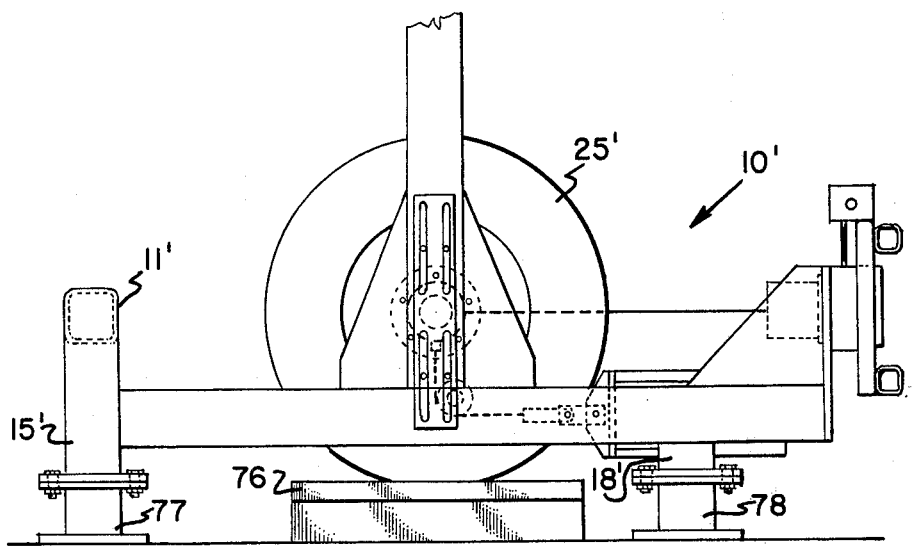
FIG. 4 is a partially schematic view of the testing apparatus of FIG. 1 adapted for static testing of a tire, with parts being broken away.

A static test of the tire 25 may be performed with the apparatus shown in FIGS. 1 and 2 by locking the drum 12 in one position; however, the preferred static test is performed on a plateform 76 as shown in FIG. 4. The platform 76 is of a type commercially available and includes force/moment transducers for measuring patch reaction forces of the tire 25'. In the modification shown in FIG. 4, the rigid frame 11' is raised by inserting stanchion extensions 77 and 78 under the front stanchions 15' and rear stanchions 18'. In operation, the tire testing apparatus 10' of FIG. 4 may be utilized in the same manner as described hereinabove for the embodiment of FIGS. 1, 2 and 3 with the additional data being provided by the force/moment transducers in the platform 76.

Figure 5:
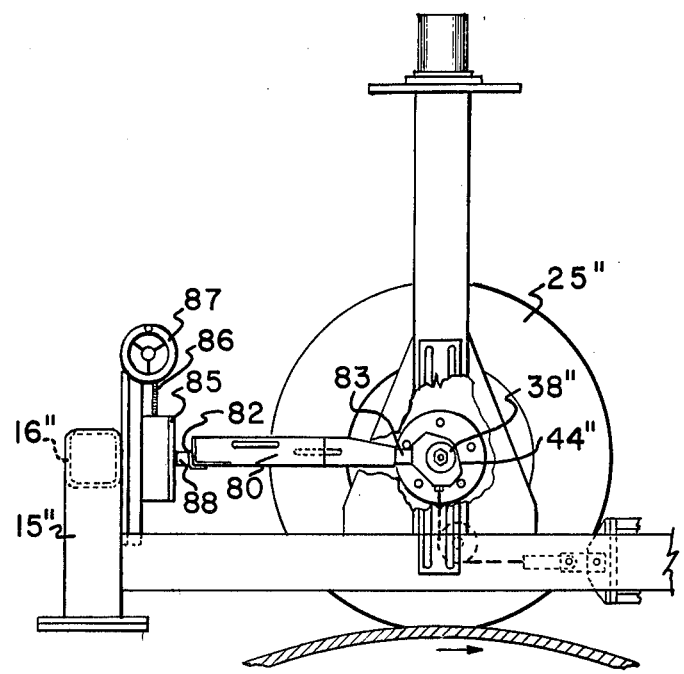
FIG. 5 is a partial fragmentary side view of the apparatus of FIG. 1 with the addition of tangential connecting means between the shaft and frame.
Figure 6:
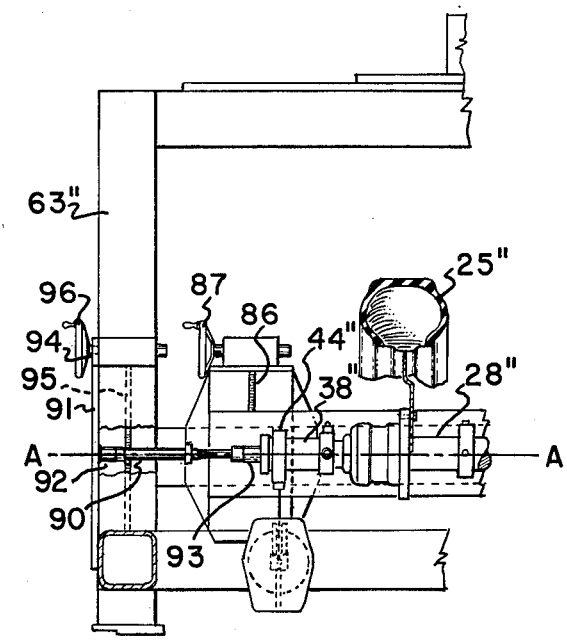
FIG. 6 is a partial schematic view like FIG. 2 with parts being broken away to show lateral connecting means between the shaft and frame.
Figure 7:
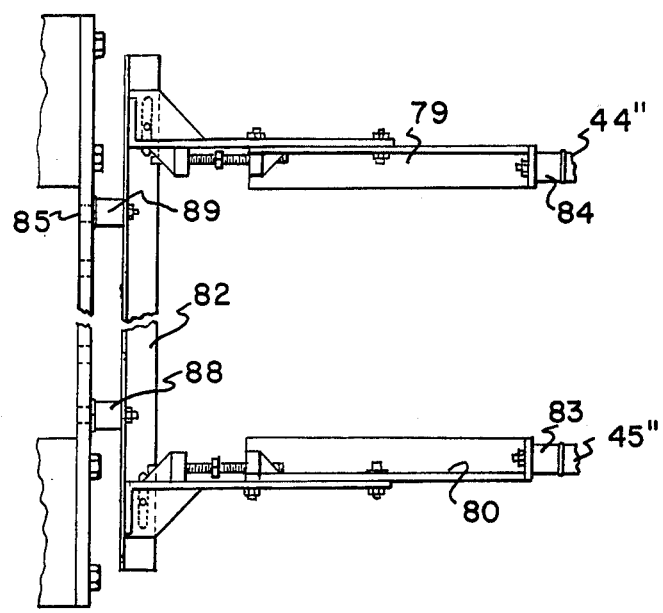
FIG. 7 is an enlarged plan view of the tangential means shown in FIG. 5 with other parts and the tire and wheel assembly not being shown.

Referring to FIGS. 5, 6 and 7, additional connecting means in the lateral and tangential directions are shown for controlling the movement of the shaft assembly 28" where this is desirable. In FIGS. 5 and 7, arms 79 and 80 extend from a supporting transverse bar 82 to the cable collars 44" and 45" on opposite sides of the tire 25". Resilient bushings 83 and 84 are mounted between the arms 79 and 80 and the cable collars 44" and 45" to minimize the constraint upon the shaft assembly 28".

A vertically adjustable supporting plate 85 may be slidably mounted on the front transverse member 16" and the front stanchions 15" with a suitable screw-actuated mechanism 86 responsive to turning of a handwheel 87 so that the arms 79 and 80 may be moved vertically to accommodate different size tires 25". Resilient bushings 88 and 89 are disposed between the transverse bar 82 and supporting plate 85 for further optimizing the constraining forces on the shaft assembly 28". Arms 79 and 80 are also adjustable in length to provide the desired steer angle.

Referring to FIG. 6, a lateral connecting means such as rod 90 connects the end of the hub extension 38" with a sliding plate 91 adjustable vertically along the vertical member 63" so that the rod will be in alignment with the shaft assembly 28". A resilient bushing 92 is positioned between the rod 90 and the sliding plate 91. Another resilient bushing 93 is positioned between the end of the rod 90 and the end of the hub extension 38" so that there will be a minimum of constraining movement on the shaft assembly 28". A vertical adjusting mechanism 94 actuated by a screw 95 and turned by a handwheel 96 may be provided to raise or lower the rod 90 so as to compensate for the different heights of the shaft assembly 28" when used for different size tires 25".

The operation of the embodiment shown in FIGS. 5, 6 and 7 is substantially the same as the operation of the embodiment described hereinabove for FIGS. 1 through 3.

As shown in FIG. 1, the exciter 58 may be mounted on a sliding plate 97 which is vertically adjustable by means of a hand-actuated screw mechanism 98 for aligning the exciter with the axis A—A of the shaft 29. In a similar manner, the exciter 60 may be adjustable vertically on plate 99 so as to maintain alignment with the axis A—A of the shaft 29.

While certain representative embodiments and details have been shown for the purpose of illustrating the invention, it will be apparent to those skilled in the art that various changes and modifications may be made therein without departing from the invention.

We claim:

1. A tire testing apparatus for loading and vibrating a tire to obtain data for determining the dynamic properties of said tire comprising:
   (a) a stationary structure having a tire supporting surface against which a tread of said tire may be urged;
   (b) a supporting fixture for rotatably supporting a wheel on which said tire is mounted for rotation about a tire and wheel axis;
   (c) flexible connecting means between said supporting fixture and said stationary structure having a low spring rate in directions generally parallel with said supporting surface;
   (d) loading means interposed between said connecting means and said stationary structure to urge said tire against said tire supporting surface;
   (e) vibration including means connected to said fixture and said stationary structure for inducing vibration in said tire, said wheel and said fixture; and (f) a response measuring means mounted on said fixture providing said data for determining dynamic properties of said tire.

2. The tire testing apparatus of claim 1 wherein said loading means has a low spring rate in a direction generally perpendicular to said supporting surface.

3. The tire testing apparatus of claim 1 wherein said stationary structure includes a rigid frame having a minimum dynamic response during imposition of said loading means and said vibration inducing means on said supporting fixture.

4. The tire testing apparatus of claim 1 wherein said supporting fixture includes a shaft assembly of minimal mass.

5. The tire testing apparatus of claim 4 wherein said shaft assembly includes a shaft coaxial with said wheel and having a rotatable hub for rotatably supporting said wheel and said shaft extending axially away from said wheel at both sides of said wheel.

6. The tire testing apparatus of claim 5 wherein said shaft is hollow and of a lightweight material.

7. The tire testing apparatus of claim 6 wherein said lightweight material is aluminum.

8. The tire testing apparatus of claim 5 wherein said flexible connecting means are attached to said shaft at side positions spaced from said tire at both sides of said wheel.

9. The tire testing apparatus of claim 8 wherein said flexible connecting means includes cable members connected to said shaft at said side positions and to said loading means.

10. The tire testing apparatus of claim 9 wherein said loading means includes a fluid pressure apparatus mounted on said supporting structure.

11. The tire testing apparatus of claim 10 wherein said fluid pressure apparatus includes an air spring connected to each of said cable member and mounted on said supporting structure.

12. The tire testing apparatus of claim 9 wherein each of said cable member extends radially away from said shaft for urging said tire against said tire supporting surface.

13. The tire testing apparatus of claim 1 wherein said flexible connecting means includes at least one cable member.

14. The tire testing apparatus of claim 1 wherein said vibration inducing means is an electromechanical exciter mounted on said stationary structure and providing push-pull excitation through a flexible coupling and load cell attached to said shaft.

15. The tire testing apparatus of claim 14 wherein said stationary structure includes a rigid frame and said exciter is mounted on said frame in alignment with the axis of said shaft for force input measurements in the fore-aft, vertical or lateral directions depending on the direction of the force input applied to the shaft.

16. The tire testing apparatus of claim 1 wherein said tire supporting surface is a simulated roadway surface and said response measuring means is an accelerometer located in a centerplane containing the centerline of the tread of said tire and within said shaft.

17. The tire testing apparatus of claim 1 wherein said tire supporting surface is a platform with force/moment transducers for measuring patch reaction forces of said tire.

18. The tire testing apparatus of claim 1 wherein said flexible connecting means extends in a direction radially of said tire and said wheel.

19. The tire testing apparatus of claim 18 wherein said apparatus includes a lateral connecting means extending from said fixture to said supporting structure in a direction axially of said tire and said wheel.

20. The tire testing apparatus of claim 18 or claim 19 wherein said apparatus includes a pair of arm members positioned on opposite sides of said tire and said wheel and located in a plane containing the axis of rotation of said wheel and said tire, said arm members extending from said fixture to said supporting structure.

* * * * *

UNITED STATES PATENT OFFICE
CERTIFICATE OF CORRECTION

Patent No. 4,359,896                     Dated November 23, 1982

Inventor(s) Jack E. Brown, Jr., Christopher E. Christie, Joseph M. Forney, and Richard M. Underwood It is certified that error appears in the above-identified patent and that said Letters Patent are hereby corrected as shown below:

Column 4, line 22, should read --of the tire 25 and accelerometers 74 and 75 may also be located at each end of the shaft 29 equidistant from the--.

Column 5, line 54, "plateform" should read --platform--.

Column 6, line 66, "including" should read --inducing--.

Signed and Sealed this

Seventh Day of June 1983

[SEAL]

Attest:

DONALD J. QUIGG

Attesting Officer       Acting Commissioner of Patents and Trademarks